T. E. BARNUM.
MOTIVE POWER CONTROLLING DEVICE.
APPLICATION FILED JULY 1, 1907.
993,814.
Patented May 30, 1911.
4 SHEETS—SHEET 1.
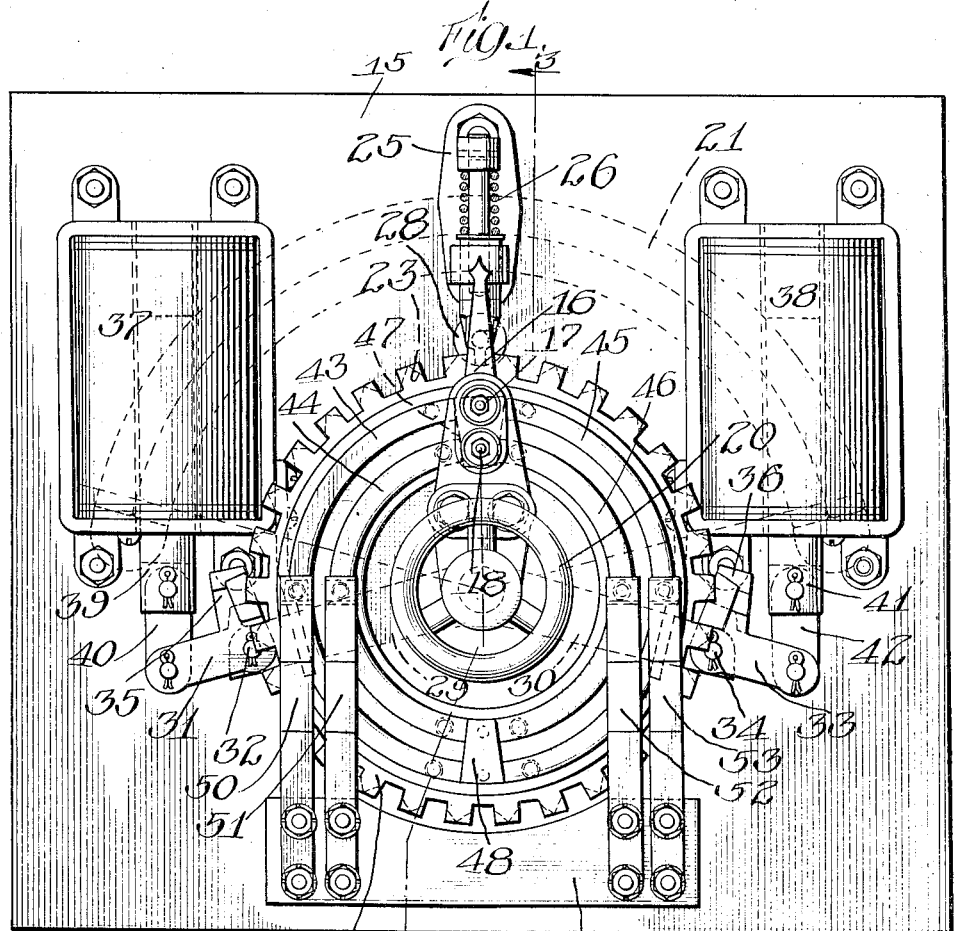
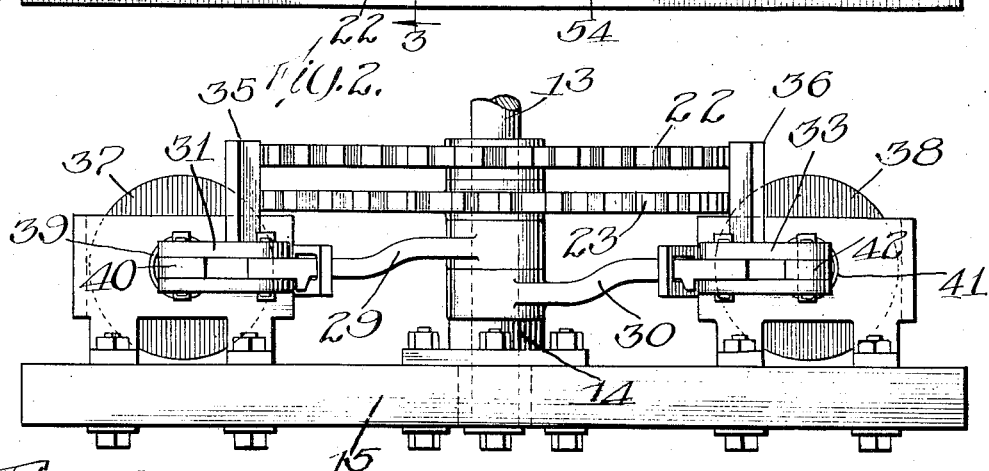
Witnesses:
Inventor:
Thomas E. Barnum
By Edwin B. H. Tower Jr.
Atty.

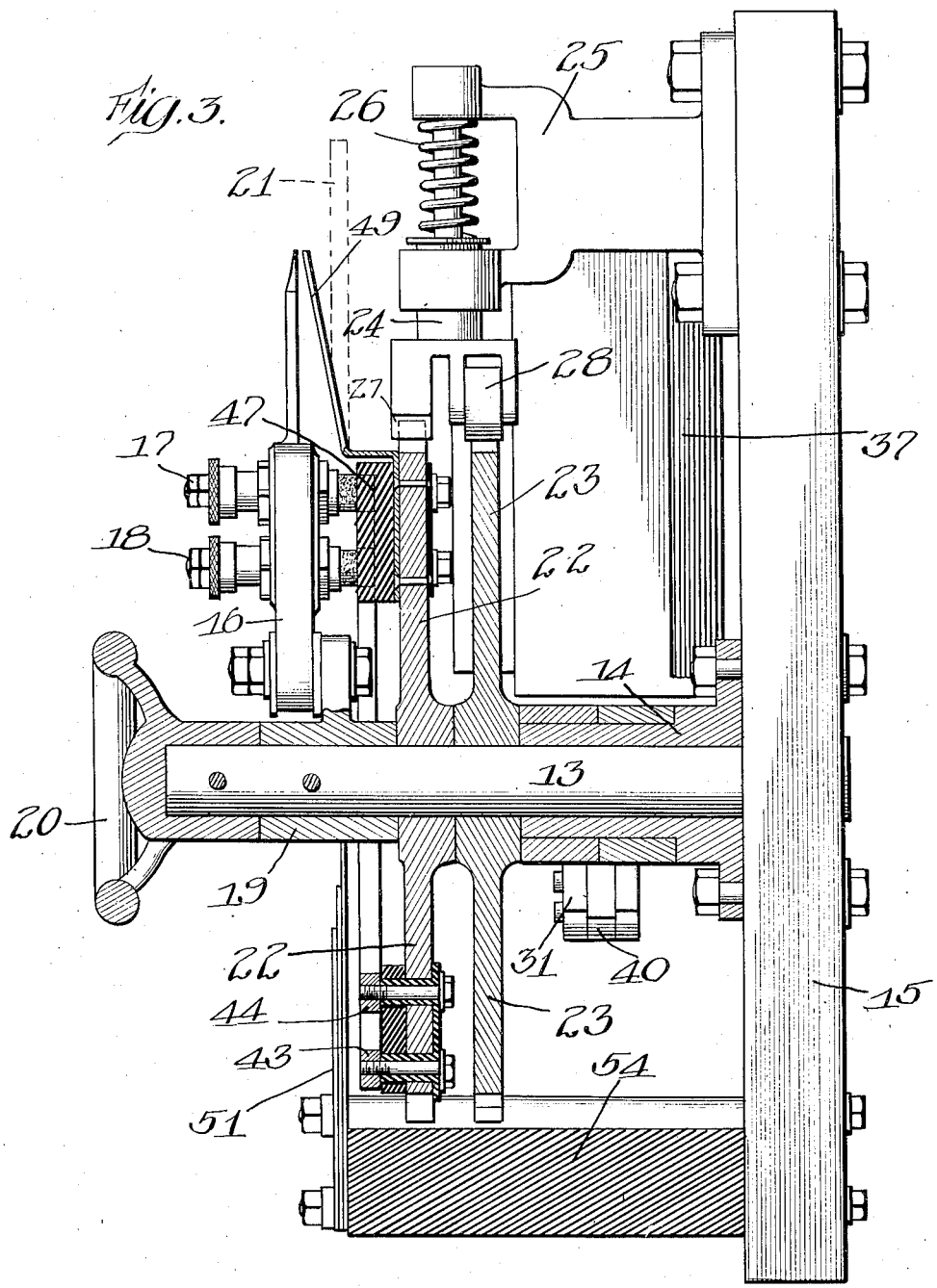

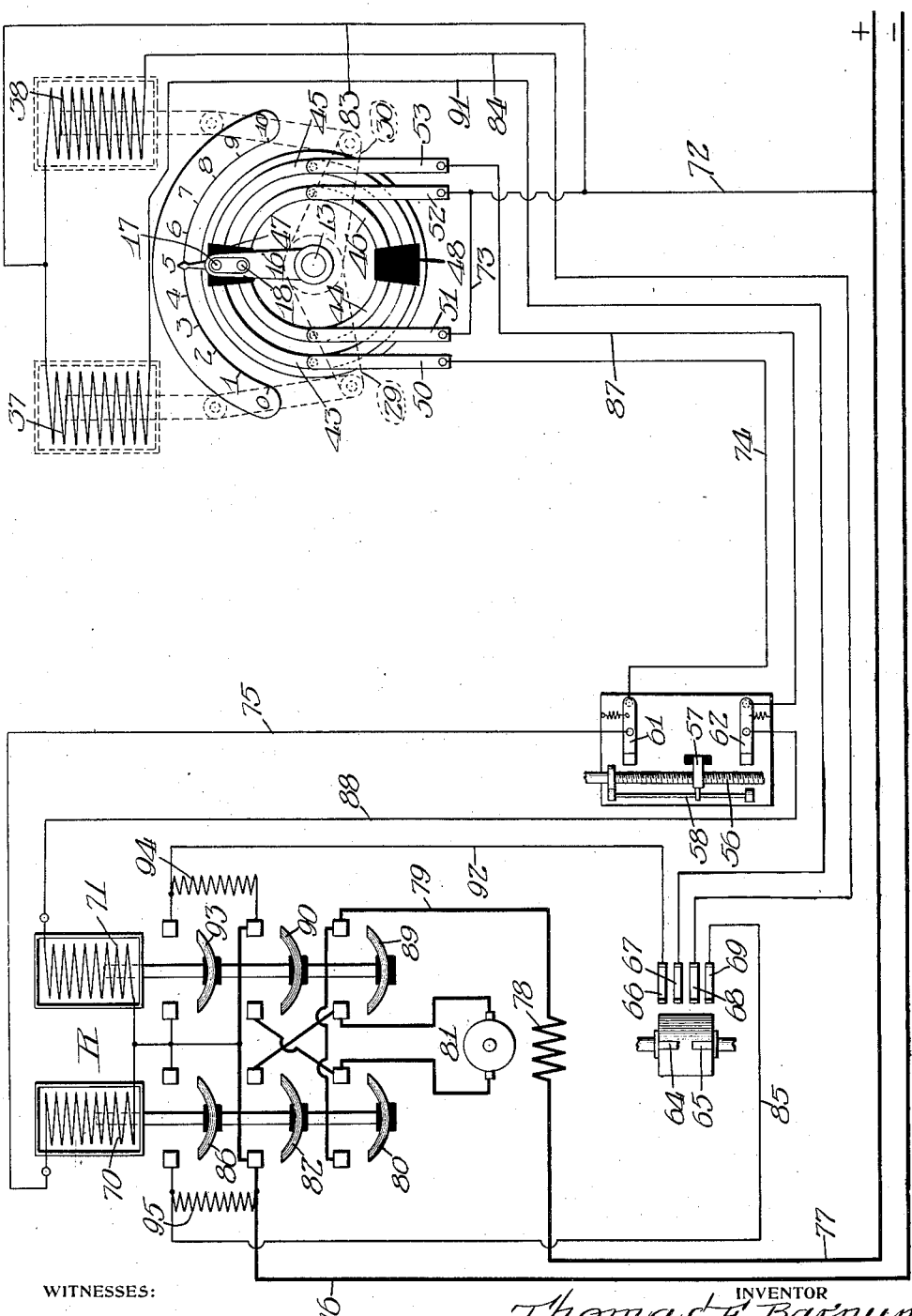

T. E. BARNUM.
MOTIVE POWER CONTROLLING DEVICE.
APPLICATION FILED JULY 1, 1907.
993,814.
Patented May 30, 1911.
4 SHEETS—SHEET 4.
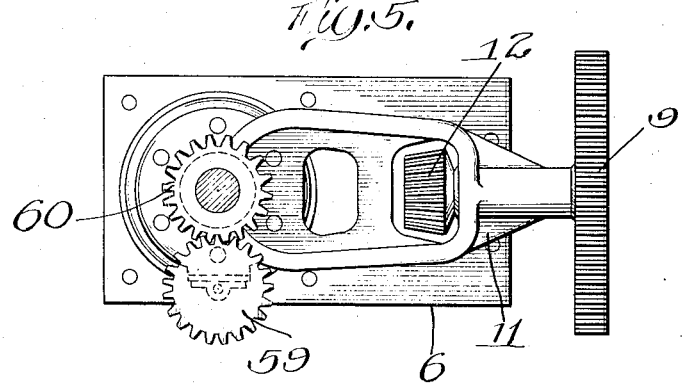
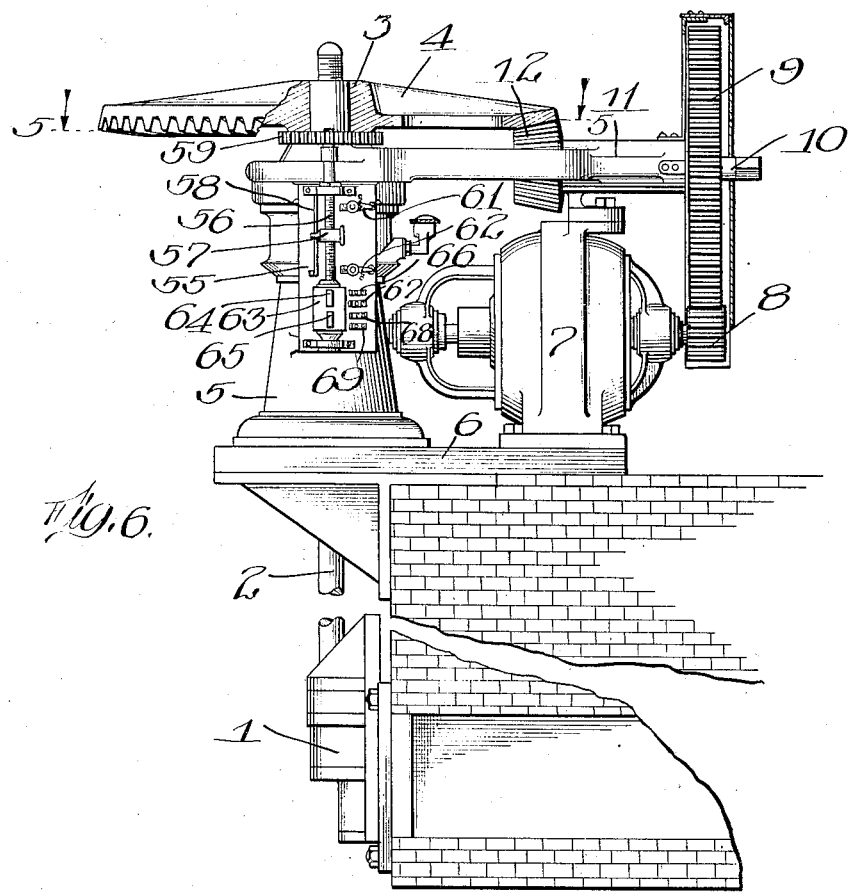
Witnesses:
Inventor:
Thomas E. Barnum

UNITED STATES PATENT OFFICE.

THOMAS E. BARNUM, OF MILWAUKEE, WISCONSIN, ASSIGNOR TO THE CUTLER-HAMMER MANUFACTURING COMPANY, OF MILWAUKEE, WISCONSIN, A CORPORATION OF WISCONSIN.

MOTIVE-POWER-CONTROLLING DEVICE.

993,814.  Specification of Letters Patent.  Patented May 30, 1911.

Application filed July 1, 1907. Serial No. 381,744.

*To all whom it may concern:*

Be it known that I, THOMAS E. BARNUM, a citizen of the United States, residing at Milwaukee, in the county of Milwaukee and State of Wisconsin, have invented new and useful Improvements in Motive-Power-Controlling Devices, of which the following is a full, clear, concise, and exact description, reference being had to the accompanying drawing, forming a part of this specification.

My invention relates to controllers.

It is especially adapted to control electric motors, but may be employed to control other forms of motive power devices.

In order to clearly exemplify the nature of my invention I assume that it is applied to operate a valve. It will be understood, however, that it may be used in other relations.

The object of my invention is to provide a controller by means of which the motor may be caused to move the valve from one position to another.

According to the preferred form of my invention I provide a master switch which is provided with a manually operated contact and an automatically operated contact adapted to directly engage said manually movable contact. The master switch controls suitable instrumentalities for stopping and starting the motor. The manually operated contact may be moved to various positions that the valve may assume. If it is desired to shift the position of the valve, the manually operated contact is moved to a position corresponding to that to which it is desired to move the valve. The motor is thus started and consequently operates the valve. Suitable interlocking means are provided between the motor and the automatically operated contacts so that the automatically operated contacts will have movement imparted thereto corresponding to that of the motor. When the valve reaches the position for which the manually operated contact is set the automatically operated contacts reach the same position in relation to the manually operated contact as it occupied before the manually operated contact was moved to start the motor. Accordingly the motor will come to rest and the valve will be stopped at the desired position.

I shall now describe one form of my invention which may be used in practice, reference being had to the accompanying drawing.

Figure 1 is an elevation of the master switch and its operating mechanism. Fig. 2 is a plan view of the operating mechanism of the operating switch. Fig. 3 is a sectional view upon the line 3—3 of Fig. 1. Fig. 4 is a diagrammatic view of my controlling system. Fig. 5 is a plan view of a part of the valve operating mechanism the view being a section taken on the line 5—5 of Fig. 6. Fig. 6 is an elevation of the valve operating mechanism.

A valve operating mechanism to which my system of control may be applied is illustrated in Figs. 5 and 6. I have shown a vertically slidable gate valve 1, which is connected to an operating rod 2, the upper end of which is threaded into the hub 3 of a bevel gear 4. The bevel gear is rotatably mounted upon the top of a post 5 which stands upon a base 6. The valve operating mechanism is run by a motor 7, the armature shaft of which carries a pinion 8. This pinion meshes with a gear 9 fixed upon one end of a counter shaft mounted in a suitable bearing 11. The other end of the counter shaft carries a bevel pinion 12 meshing with the bevel gear 4. When the motor is running, the bevel gear 4 is rotated, and inasmuch as the operating rod 2 is threaded into the hub 3, the valve is raised or lowered according to the direction in which the motor is running. If the motor be running in one direction, the valve will be raised, and if it be running in the reverse direction, the valve will be lowered. Accordingly the motor may operate the valve mechanism to open and close the valve.

Figs. 1, 2, and 3 show the range setter or master switch which is employed to control instrumentalities for starting and stopping the motor. It is provided with a shaft or spindle 13 which is journaled in a bearing sleeve 14, mounted upon a suitable base 15. The shaft carries a switch arm 16 upon which are mounted electrically connected brushes or contact fingers 17 and 18, which are insulated from the arm. The switch arm is preferably bolted to a hub 19 which is fixed upon the shaft 13 carrying a hand wheel 20. When the shaft 13 is turned, the pointer is moved over a dial 21, indicated in dotted lines. A straight toothed ratchet wheel 22 and a pointed toothed ratchet wheel 23 are loosely journaled upon the shaft 13. These ratchet wheels are engaged by a pawl 24 which is vertically movable in a guide 25 carried by the base 15. The pawl 24 is preferably pressed downwardly into engagement with the ratchet wheels by means of a spring 26. The pawl carries a dog or tooth 27 and a roller 28. The tooth 27 engages the ratchet wheel 22 to lock it against rotation. The roller 28 engages the ratchet wheel 23. The ratchet wheel 22 cannot be rotated alone as it is locked against rotation by the pawl 24. Both ratchet wheels may be moved together, however, as the pointed teeth on the ratchet wheel 23 engage the roller 28, and raise the tooth 27 from the ratchet wheel 22. Two arms 29 and 30 are pivoted upon the bearing sleeve 14. A bell crank pawl 31 is pivoted upon the free end of the arm 29 by means of a pin 32. A similar pawl 33 is pivoted on the free end of the arm 30 by means of a pin 34. One arm of the pawl 31 is provided with a finger or dog 35 which extends across the peripheries of both ratchet wheels 22 and 23 so as to be able to engage the teeth of both wheels. The pawl 33 is provided with a similar finger or dog 36.

Two solenoids 37 and 38 are suitably mounted upon frames attached to the base 15. These solenoids are employed to operate the pawls 31 and 33. The solenoid 37 is provided with a plunger 39 which is connected to the pawl 31 by means of a link 40 which is suitably pivoted to said parts by means of pins. The solenoid 38 is provided with a plunger 41 which is connected to the pawl 33 by means of a link 42, said pawl being suitably pivoted to said parts by means of pins.

When the solenoid 37 is energized, it raises the plunger 39, thereby tilting the pawl 31 until the dog 35 engages the ratchet wheels 22 and 23, and then said pawl is drawn upwardly, the arm 29 rising with it to allow such movement whereby the ratchet wheels are rotated for a predetermined degree. When the solenoid is deënergized, the plunger descends, thereby returning the pawl to its initial position. It will thus be seen that if the solenoid 37 be intermittently energized, the ratchet wheels will be rotated together, step by step, in one direction.

When the solenoid 38 is energized, it raises the plunger 41, to operate the pawl 33 in the same manner as the solenoid 37 operates the pawl 31. Inasmuch as the pawls are arranged reversely in respect to the ratchet wheels, one pawl will rotate said wheels in one direction and the other in the opposite direction. The direction of rotation of the ratchet wheels will, therefore, depend upon which solenoid is energized.

The ratchet wheel 22 carries four insulated contact segments 43, 44, 45 and 46. These contact segments are arranged in the same plane. The segments 43 and 44 are arranged concentrically as are the segments 45 and 46, the segments 43 and 44 being arranged on one side of a diametrical line running through the axis of the ratchet wheel 22, and the segments 45 and 46 being arranged on the other side of said line. Between the pair or segments 43 and 44 and the pair of segments 45 and 46 are arranged insulating contact blocks 47 and 48. The brushes 17 and 18 are adapted to sweep over the segments 43, 44, 45, and 46, the brush 17 being arranged to engage segments 43 and 45 and the brush 18 being arranged to engage segments 44 and 46. The ratchet wheel 22 is provided with a pointer or hand 49 which is adapted to register with the pointer on the switch arm 16 when the brushes 17 and 18 stand on the insulating block 47. The segments 43 and 44 are engaged by brushes 50 and 51 respectively while the segments 45 and 46 are engaged by brushes 52 and 53 respectively. These brushes are preferably mounted upon an insulating block 54, which is carried by the base 15.

The valve operating mechanism is preferably provided with a limit switch and a commutator. The limit switch serves to stop the motor whenever the valve reaches either limit of its movement. The commutator serves to intermittently close the circuits of the windings of the solenoids 37 and 38 when the mechanism is in operation. The commutator and the limit switch may be mounted upon a base 55 supported in the post 5. This base carries suitable bearings in which is journaled a screw threaded shaft 56 on which runs a dog 57 which is prevented from turning by a guide rod 58. The shaft 56 is driven from the bevel gear 4 by means of a pinion 59 fixed upon said shaft and meshing with a pinion 60 connected to said gear 4. The base 55 carries two spring closed limit switches 61 and 62. The dog 57 is moved along the shaft 56 while the valve mechanism is operating. When the valve reaches one limit of movement, the dog opens the limit switch 61 and when it reaches the other limit, the dog 61 engages the limit switch 62.

The commutator is provided with a drum 63 which is carried by the shaft 56. The drum carries contacts 64 and 65. During each revolution of the drum, the contacts 64 and 65 engage contact fingers or brushes 66, 67, 68, and 69, the contact 64 bridging contact fingers 66 and 67 and the contact 65 bridging contact fingers 68 and 69.

Fig. 4 shows the system of control that may be employed to start and stop the motor, the various elements thereof being diagrammatically indicated. The commutator and the limit switch are separated in this figure for convenience of illustration. The motor circuit is controlled by means of a reversing switch R which is operated by means of solenoids 70 and 71. The drawing shows the switch arm 16 in the position it would occupy if the valve were half open. If the operator desires to close the valve, he moves the switch arm 16 to the zero position indicated upon the dial, thereby moving the brushes 17 and 18 over the segments 43 and 44. The circuit of the solenoid 70 is thus completed and consequently the reversing switch is closed, thereby starting the motor. The circuit of the solenoid 70 extends from the positive line through conductor 72, conductor 73, brush 51, segment 44, brushes 18 and 17, segment 43, brush 50, conductor 74, limit switch 61, conductor 75, and solenoid 70, to conductor 76, and thence to the negative line. The reversing switch will then close the motor circuit from the positive line through conductor 77, field 78, conductor 79, switch 80, armature 81, switch 82, and conductor 76 to the negative side of the line. The motor will thus be started, thereby driving the valve operating mechanism to close the valve. The operation of the valve mechanism will cause the rotation of the commutator drum 63. During each revolution of the drum, the contacts 64 and 65 will momentarily engage the contact fingers 66, 67, 68, and 69. The solenoid 38 will thus be intermittently energized. Circuit of said solenoid extends from the positive line through conductor 72, conductor 83, solenoid 38, conductor 84, finger 68, contacts 65, finger 69, conductor 85, switch 86, and conductor 76 to the negative side of the line. The solenoid 38 intermittently operates the ratchet wheels 22 and 23 around until the contact segments 43 and 44 leave the brushes 17 and 18, and said brushes rest upon the insulating block 47. The circuit of the solenoid 70 will then be broken and consequently the reversing switch will open, thereby opening the motor circuit and causing the motor to come to rest. The operation of the motor, the range setter and the valve are so timed that the valve will be closed when the motor is stopped.

It will be noted that the motor and the range setter are electrically interlocked in such a way through the commutator which is driven by the motor that the motor will be stopped when it has operated through the range which is set by the master switch. If the operator desires to open the valve fully, he moves the range setter to the tenth position indicated upon the dial. The reversing switch would then be closed by the solenoid 71, the circuit through said solenoid extending from the positive line 72 through brush 52, segment 46, brushes 18 and 17, segment 45, brush 53, conductor 87, limit switch 62, conductor 88, solenoid 71, and conductor 76 to the negative line. The reversing switch will then close the motor circuit from the positive line through conductor 77, field 78, conductor 79, switch 89, armature 81, switch 90, and conductor 76 to the negative line. When the motor is started the commutator will cause the solenoid 37 to be intermittently energized. The circuit of the solenoid 37 will extend from the positive line through conductor 72, conductor 83, solenoid 37, conductor 91, finger 67, contact 64, finger 66, conductor 92, switch 93 and conductor 76 to the negative line. When the ratchet wheels 22 and 23 have been stepped around until the segments 45 and 46 leave the brushes 17 and 18, and said brushes rest upon the insulating contact block 47, the winding 71 will be deënergized, thereby causing the reversing switch to stop the motor. The valve will then be fully open. The range setter may be set to bring the valve to any of the positions indicated upon the dial between the closed position and the fully open position. If the motor runs the valve at any time beyond the proper limits of movement, the dog 57 will open one or the other of the limit switches 61 and 62 according to the direction in which the valve is being moved. If the limit switch 61 be opened it will deënergize the solenoid 70. If the limit switch 62 be opened, it would deënergize the solenoid 71.

It will be noted that the motor may be stopped in such a position as to leave the contacts 64 and 65 in engagement with the fingers 66, 67, 68, and 69. The windings 37 and 38 will then be connected in circuit in series with the resistances 94 and 95, the circuit of winding 37 extending from the positive line through conductor 72, conductor 83, solenoid 37, conductor 91, finger 67, contact 64, finger 66, conductor 92, resistance 94, and conductor 76 to the negative side of the line and the circuit of the winding 38 extending from the positive line through conductor 72, conductor 83, solenoid 38, conductor 84, finger 68, contact 65, finger 69, conductor 85, resistance 95 and conductor 76 to the negative line. The resistances 94 and 95 are sufficient to reduce the current flowing through the windings to a retaining current. Under the conditions that have just been set forth, the winding that has been energized will keep its plunger raised until the motor is again started. If the winding were allowed to drop its plunger, it would be energized again immediately on starting the motor, and in the event that the motor was started in the reverse direction to that in which it had previously been run the range setter would first be run back a step before being moved in the proper direction, and consequently would be placed out of step with the motor. The electrical interlock which is provided between the reversing switch and the range setter serves to prevent the range setter from being placed out of step with the motor when the commutator closes the circuit to the solenoid 37 and 38, while the motor is at rest.

It will be seen that the range setter may be set to start the motor in either direction throughout the intermediate portions of a certain range of operation and that said range setter may be set to limit the range of operation of the motor to any degree or period that may be selected by the operator.

While I have described my invention as applied to operate a valve, it will be seen that it is susceptible of various applications, and that it may be embodied in various forms.

Having thus described my invention what I claim as new and desire to secure by Letters Patent, is:

1. A motor controlling device, comprising a pair of movable members having directly engaging contacts, one of said members being movable at will, and electromagnetic means for moving the other of said members in synchronism with the motor in a step by step manner, said first-mentioned member being movable in opposite directions to control the direction of operation of the motor and the range of operation of the device.

2. In a controller for electric motors, the combination with separate electro-responsive circuit controlling instrumentalities for controlling the direction of operation of the motor, of a switch for controlling said instrumentalities, comprising a pair of movable members having directly engaging contacts, one of said members being movable at will and the other of said members being movable automatically in synchronism with the motor.

3. In a controller for electric motors, in combination, with separate electromagnetically operated switches for controlling the continuity of the motor circuit and the direction of operation of the motor, of a switch comprising a pair of movable members having directly engaging contacts, one of said members being movable at will in opposite directions to control the energization of said electromagnetically operated switches, and electroresponsive means for moving the other of said members in synchronism with the motor and in a step by step manner.

4. In a controller for electric motors, the combination with a pair of movable members having directly engaging contacts, one of said members being movable at will in opposite direction to control the direction of operation of the motor, of electroresponsive means for operating the other of said members in either direction and means actuated by the motor for intermittently energizing the operating windings of said means.

5. In a controller for electric motors, the combination with a plurality of electromagnetically operated switches for controlling the continuity of the motor circuit and the direction of operation of the motor, of a switch for controlling the circuits of the operating windings of said first-mentioned switches, comprising a pair of movable members having directly engaging contacts, one of said members being movable at will in opposite directions for controlling the direction of operation of the motor, electro-responsive means for operating the other of said members in either direction and means operated by the motor for intermittently energizing the operating windings of said means.

6. In a controller for electric motors, in combination, a pair of electromagnetically operated reversing switches, a switch for directing the operation of said reversing switches comprising a pair of movable members having directly engaging contacts, the contacts of one of said members comprising a pair of oppositely disposed segments, the contact of the other movable member being adapted to rest between said segments when the motive power device is inoperative and movable in either direction to engage said contact segments, means for moving said contact member at will, and means for moving the contact segments in synchronism with the motive power device and in a step by step manner.

7. The combination with a motive power device, of controlling instrumentalities therefor, a switch for directing the operation of said instrumentalities having movable members provided with directly engaging contacts, the contacts of one of said members comprising a pair of contact segments between which the contact of the other member is adapted to rest when the motive power device is stationary, said contact device being adapted to be moved at will into engagement with either of said segments, a mechanism for moving the segment carrying member in one direction, a mechanism for moving the segment carrying member in the opposite direction, electro-responsive means for operating each of said mechanisms, and means operated from the motor for intermittently energizing said electro-responsive devices.

8. The combination with a motive power device, of controlling instrumentalities therefor, a switch having movable members provided with directly engaging contacts, the contact of one of said members comprising a pair of segmental contact members between which the contact of the other member is adapted to rest when the motive power device is inoperative, said contact being movable at will, an electro-responsive device for moving said member carrying the segmental contacts in one direction, a second electro-responsive device for moving the member in the opposite direction, and means whereby when the contact is moved into engagement with one of said contact segments, the electro-responsive device corresponding to that segment will be energized.

9. The combination with a motive power device, of controlling instrumentalities therefor, a switch controlling said instrumentalities having movable members provided with directly engaging contacts, the contacts of one of said members comprising a pair of segmental members between which the other contact member is adapted to rest when the motive power device is inoperative said contact member being movable at will to engage either one of said segmental contacts, an electro-responsive device for moving said segmental contact carrying member in one direction, a second electro-responsive device for moving said segmental contact member in the opposite direction, means whereby when said first member is moved into engagement with one of the contact segments of the other member the circuit of the corresponding magnet will be closed, and means operated from the motive power device for intermittently energizing said magnet.

10. The combination with a motive power device, of controlling instrumentalities therefor, a switch for directing the operation of said instrumentalities comprising a plurality of contact segments arranged in pairs, the pairs of segments having their adjacent ends separated by nonconducting material, one member of each pair being electrically connected with the supply circuit, and the other member of each pair being electrically connected with the motor controlling instrumentalities, the other movable member of said switch having contacts arranged to engage said pairs of contact segments and connect the motor controlling instrumentalities with the supply circuit said contact member being movable at will, and means for moving the pairs of segments until they are out of engagement with the contacts of the other movable member.

11. In a controller for electric motors, in combination, a pair of members having directly engaging contacts, the contacts of one of said members comprising a pair of oppositely disposed segments, the contact of the other movable member normally resting between said segments and adapted to be moved in either direction to engage one of said segments, and electromagnetic means for moving the contact segments in synchronism with the motor.

12. The combination with an electric motor, of controlling devices therefor, a switch for directing the operation of said controlling devices having movable members provided with directly engaging contacts, the contacts of one member comprising concentrically arranged segmental strips, the contact of the other member being adapted to normally rest between said segments, said contact being movable at will, electro-responsive means for moving said contact segments, and means operated by the motor to cause the contact segments to be moved in synchronism with the motor.

13. The combination with an electric motor, adapted to run in either direction, of controlling instrumentalities therefor, a switch adapted to control said instrumentalities comprising a pair of movable members having directly engaging contacts, the contacts of one of said members comprising oppositely disposed segments insulated from one another, the contact of the other movable member being adapted to rest between the opposite segments when in its normal position, said contact being movable at will, means for moving the contact segments in synchronism with the motor, and electrical connections whereby, when the contact member is moved in one direction, the controlling instrumentalities will be operated to cause the motor to run in one direction, and when moved in the opposite direction, the operation of the motor will be reversed.

14. The combination with a motor, of controlling instrumentalities therefor, a switch for controlling the operation of said instrumentalities, comprising a pair of members having directly engaging contacts, the contacts of one member comprising pairs of concentrically arranged segmental strips, the contact of the other member being so arranged as to lie between and out of engagement with the segments when in normal position, said contact being adapted to be moved at will into engagement with certain of said segments, to cause the operation of said instrumentalities, electro-responsive means for moving said contact segments and means operated from the motor for intermittently energizing said electro-responsive means to cause said contact segments to be moved in synchronism with said motor.

15. In a switch, a pair of movable members having directly engaging contacts, the contacts on one of said members comprising segmental strips, insulated from one another, the contact of the other member being adapted to normally rest between said segments, one of said members being movable at will to engage certain of the contacts, and electromagnetic means for moving the other member to bring the members into normal position.

16. In a controller for electric motors, the combination with a pair of electromagnetically operated reversing switches for controlling the motor circuit, of a switch for controlling the circuits of the operating windings of said reversing switches, comprising a pair of movable members, two pairs of contact segments carried by one of said members, a contact carried by the other of said members and insulated therefrom, said contact being adapted to bridge either of said pairs of contact segments, said contact-carrying member being movable at will to cause the closure of either of said reversing switches, electro-responsive means for actuating said segment-carrying member in either direction and means operated by the motor for intermittently energizing the operating windings of said means.

In witness whereof, I have hereunto subscribed my name in the presence of two witnesses.

THOMAS E. BARNUM.

Witnesses:
W. E. SARGENT,
F. H. CRANE.